US005578222A

United States Patent [19]
Trischuk et al.

[11] Patent Number: 5,578,222
[45] Date of Patent: Nov. 26, 1996

[54] RECLAMATION OF ABRASIVE GRAIN

[75] Inventors: Ronald W. Trischuk; Ajay K. Garg; Arup K. Khaund, all of Northborough, Mass.

[73] Assignee: Saint-Gobain/Norton Industrial Ceramics Corp., Worcester, Mass.

[21] Appl. No.: 575,655

[22] Filed: Dec. 20, 1995

[51] Int. Cl.$^6$ ........................................................ B01D 11/02
[52] U.S. Cl. .............................. 210/773; 134/10; 451/88; 451/559; 125/11.01
[58] Field of Search ................................ 210/773; 134/2, 134/10; 451/88, 559; 125/11.01

[56] References Cited

U.S. PATENT DOCUMENTS

| | | |
|---|---|---|
| 3,802,916 | 4/1974 | Jackson . |
| 3,905,898 | 9/1975 | Jackson . |
| 3,997,359 | 12/1976 | Dankoff et al. . |
| 4,455,251 | 6/1984 | Wood et al. . |
| 4,523,988 | 6/1985 | Hedrick, II . |
| 4,920,704 | 5/1990 | Caserta et al. . |

Primary Examiner—Robert J. Popovics
Attorney, Agent, or Firm—David Bennett

[57] ABSTRACT

The invention provides a process for recovering abrasive grains from vitreous bonded materials by boiling the material in an aqueous solution of an alkali metal base.

6 Claims, No Drawings

RECLAMATION OF ABRASIVE GRAIN

BACKGROUND TO THE INVENTION

The present invention relates to the reclamation of abrasive grain from vitreous bonded abrasive items such as grinding wheels and fragments thereof.

The production of vitreous bonded abrasive materials involves the mixing of abrasive grains with the components that on fusion will form a glass. This mixture may also include pore formers to ensure that the finished abrasive item is not without porosity. In some cases the glass-forming components may be replaced in whole or in part by a crushed glass or "frit". The mixture is usually cold pressed to the desired size in a mold and then placed in a furnace. As the temperature rises the glass components, (or the frit), melt and combine to form the glass which then flows over the surfaces of the grains and locates preferentially at points where adjacent grains touch or are in close proximity. At these points the glass forms bond posts linking the adjacent abrasive grains. Thus the typical vitreous bonded abrasive material comprises a large volume proportion of grains held together by a relatively small volume proportion of glass bond.

When a vitreous bonded wheel is formed the wheel is often discarded when only a fraction of the volume has been used. In addition the manufacturing process can on occasion produce products that are outside acceptable standards and the product must be rejected and sent to landfill, perhaps after having first been crushed, with all the extra expense this involves.

While this type of loss, expense and wastage is built into the manufacturing processes and is tolerated as part of the cost of doing business, as the technology going into the grain itself becomes more and more sophisticated, the value of the grain increases and the wastage becomes increasingly less acceptable.

A process has now been discovered which permits the recovery of grain from discarded vitreous-bonded abrasive materials and fragments of such materials. The process is inexpensive and makes grain recovery economically viable and reduces the amount of landfilling that needs to occur.

DESCRIPTION OF THE INVENTION

The present invention provides a process for the recovery of abrasive grain from vitreous bonded abrasive materials which comprises dissolving at least part of the bond material in an aqueous solution of an alkali metal base and then separating the grain.

Vitreous bonds used in the manufacture of vitreous bonded abrasives comprise an amorphous or partly crystalline mixture of oxides, (including mixed or complex oxides), which has major components selected from: silica, alumina, boron oxide, phosphorus oxide, alkali metal oxides, alkaline earth metal oxides, and other smaller amounts of oxides of metals which may include iron, titanium and lead for example. Some of these, such as silica (which is the dominant component of all glasses), readily form alkali metal salts which are at least partially soluble and, when removed, make the glass lose its structural strength and integrity. The preferred bond materials comprise at least 30%, such as at least 50%, and often as much as 60% or more, by weight of silica.

The alkali metal base reactants can be for example lithium hydroxide, sodium hydroxide or potassium hydroxide and mixtures thereof. The hydroxides of sodium and potassium are often the most convenient in practice. It is possible however to use a base such as an alkali metal carbonate or bicarbonate though the reaction can be expected to take somewhat longer. The concentration of the base clearly controls the speed of the reaction to some extent and for this reason more concentrated solutions are preferred. When an alkali metal base is used the concentration is preferably at least 30% such as about 40 to 60% by weight of the hydroxide. However if the alkali metal is lithium, the very lightness of the metal make it possible to operate at a weight percent of as little as 10% of the base.

If weaker solutions are used or if reaction is concluded before it is complete, the reaction should have progressed to the extent that the bond has been sufficiently weakened to allow the material to be readily crumbled such that a simple mechanical de-burring operation allows the individual grains to be separated.

The reaction preferably takes place with the accompaniment of heat to speed the reaction. Typically the vitreous-bonded material is boiled with the base. Where the reaction product is likely to solidify as a glass on cooling, hot filtering to separate the grains is desirable. Otherwise cold filtration is an acceptable approach.

The nature of the grain separated is not critical providing the grain is not itself significantly reactive with the base with which the abrasive material is reacted. Some degree of reaction can be tolerated but this should not be such as to undermine the economics of the process. Aluminum oxide reacts relatively little with alkali metal bases and so alumina abrasive grits can be salvaged by the above technique, as well as alumina/zirconia grains, silicon carbide and more expensive grains such as diamond and cubic boron nitride.

DESCRIPTION OF PREFERRED EMBODIMENT

The invention is now illustrated by reference to the following examples which are for the purpose of illustration only and are intended to imply no essential limitation of the scope of the invention.

EXAMPLE 1

Fragments of a discarded vitreous bonded abrasive wheel comprising a seeded sol-gel alumina abrasive grain and a bond with the empirical formula, expressed as moles of the oxides, was: $Na_2O..0.47$; $K_2O..0.07$; $MgO..0.25$; $CaO..0.21$; $Al_2O_3..0.58$; $Fe_2O_3..0.01$; $B_2O_3..0.65$; $SiO_{2..3.77}$ and $TiO_{2..0.03}$.

Pieces of the grinding wheel 3–20 mm in size and weighing 19 gm were added to 50 gm of a 50% solution of sodium hydroxide in a stainless steel container. Heating of the mixture at its boiling point, (about 140° C.), was continued for about 30 minutes. At the end of this time the fragments were found to have crumbled and the grain spontaneously separated. The mixture was filtered, cooled and rinsed with water. Abrasive grains were recovered that were substantially free of the vitreous bond.

What is claimed is:

1. A process for the recovery of abrasive grains from vitreous bonded grinding wheels and fragments thereof, said process comprising the steps of:
   a) placing vitreous bonded grinding wheels and/or fragments thereof in an aqueous solution of an alkali metal base, thereby forming an aqueous mixture;
   b) allowing at least part of said vitreous bond to dissolve; and c) separating the abrasive grains from the aqueous mixture.

2. A process according to claim 1 in which the alkali metal base is selected from the group consisting of lithium hydroxide, sodium hydroxide, potassium hydroxide and mixtures thereof.

3. A process according to claim 2 in which the base solution has a concentration of at least 10% by weight.

4. A process according to claim 1 in which the bond comprises at least 30% by weight of silica.

5. A process according to claim 1 in which the grain is alumina based.

6. A process according to claim 1 in which the vitreous bonded material is heated with the base solution and grain is separated from the aqueous mixture by filtration while the mixture is still hot.

* * * * *